(12) United States Patent
Marchal et al.

(10) Patent No.: US 10,724,159 B2
(45) Date of Patent: Jul. 28, 2020

(54) FIBER BLANK WOVEN AS A SINGLE PIECE BY THREE-DIMENSIONAL WEAVING TO MAKE A CLOSED BOX-STRUCTURE PLATFORM OUT OF COMPOSITE MATERIAL FOR A TURBINE ENGINE FAN

(71) Applicant: SAFRAN AIRCRAFT ENGINES, Paris (FR)

(72) Inventors: Yann Marchal, Melun (FR); Matthieu Gimat, Portsmouth, NH (US); Dominique Coupe, le Haillan (FR); Bruno Dambrine, le Chatelet en Brie (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 62 days.

(21) Appl. No.: 16/138,529

(22) Filed: Sep. 21, 2018

(65) Prior Publication Data
US 2019/0024274 A1   Jan. 24, 2019

Related U.S. Application Data

(62) Division of application No. 14/397,052, filed as application No. PCT/FR2013/050841 on Apr. 17, 2013, now Pat. No. 10,145,039.

(30) Foreign Application Priority Data

Apr. 26, 2012 (FR) .................................. 12 53881

(51) Int. Cl.
*D03D 25/00* (2006.01)
*F01D 9/02* (2006.01)
(Continued)

(52) U.S. Cl.
CPC ............ *D03D 25/005* (2013.01); *B29B 11/16* (2013.01); *B29C 70/222* (2013.01); *B29C 70/24* (2013.01);
(Continued)

(58) Field of Classification Search
None
See application file for complete search history.

(56) References Cited

U.S. PATENT DOCUMENTS 5,080,142 A   1/1992   Calamito et al.
5,358,758 A   10/1994  Skelton et al.
(Continued)

FOREIGN PATENT DOCUMENTS

| EP | 0 391 745 | 10/1990 |
| FR | 2 946 999 | 12/2010 |
| WO | 2011/080443 | 7/2011 |

OTHER PUBLICATIONS

International Search Report issued in PCT/FR13/050841 dated Jun. 11, 2013.

*Primary Examiner* — Shawn Mckinnon
(74) *Attorney, Agent, or Firm* — Oblon, McClelland, Maier & Neustadt, L.L.P.

(57) ABSTRACT

A fiber blank woven as a single piece by three-dimensional weaving to make a closed box-structure platform out of composite material for a turbine engine fan. In each plane of the fiber blank, a set of warp yarns interlinks layers of weft yarns in first, second, and third portions of the fiber blank, while leaving a closed non-interlinked zone separating the first and second portions over a fraction of the dimension of the fiber blank in the warp direction between an upstream non-interlinking limit and a downstream non-interlinking limit, and while leaving at least one open non-interlinked zone separating the second and third portions over a fraction of the dimension of the fiber blank in the warp direction (Continued)

from a non-interlinking limit to a downstream edge of the fiber blank. A method of fabricating a preform for the closed box-structure platform can use such a fiber blank.

13 Claims, 7 Drawing Sheets

(51) Int. Cl.
| | |
|---|---|
| *B29B 11/16* | (2006.01) |
| *B29C 70/22* | (2006.01) |
| *B29C 70/24* | (2006.01) |
| *B29C 70/48* | (2006.01) |
| *F01D 9/04* | (2006.01) |
| *B29D 99/00* | (2010.01) |
| *D03D 11/02* | (2006.01) |
| *F01D 5/28* | (2006.01) |
| *F01D 11/00* | (2006.01) |
| *B29D 22/00* | (2006.01) |
| *B29L 31/00* | (2006.01) |
| *B29K 105/08* | (2006.01) |
| *B29L 9/00* | (2006.01) |
| *B29L 22/00* | (2006.01) |
| *B29L 31/08* | (2006.01) |

(52) U.S. Cl.
CPC .............. *B29C 70/48* (2013.01); *B29D 22/00* (2013.01); *B29D 99/0028* (2013.01); *D03D 11/02* (2013.01); *F01D 5/28* (2013.01); *F01D 5/282* (2013.01); *F01D 9/02* (2013.01); *F01D 9/04* (2013.01); *F01D 11/008* (2013.01); *B29K 2105/0845* (2013.01); *B29L 2009/00* (2013.01); *B29L 2022/00* (2013.01); *B29L 2031/082* (2013.01); *B29L 2031/7504* (2013.01); *D10B 2505/02* (2013.01); *Y02T 50/672* (2013.01); *Y10T 428/24149* (2015.01); *Y10T 442/3203* (2015.04)

(56) References Cited

U.S. PATENT DOCUMENTS

| | | |
|---|---|---|
| 2012/0099982 A1 | 4/2012 | Coupe et al. |
| 2013/0089429 A1 | 4/2013 | Nunez et al. |
| 2014/0349538 A1 | 11/2014 | Marchal et al. |

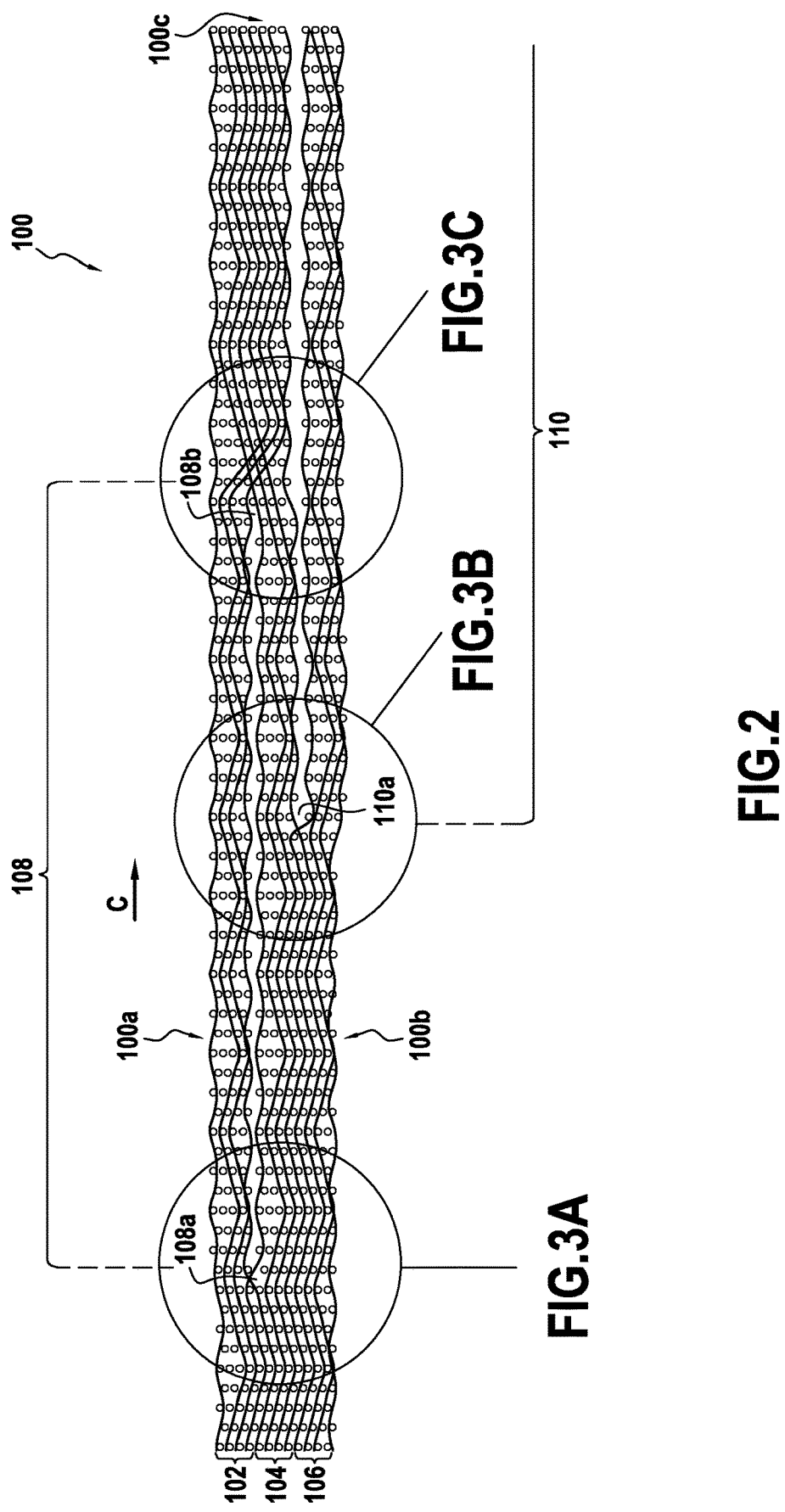

FIBER BLANK WOVEN AS A SINGLE PIECE BY THREE-DIMENSIONAL WEAVING TO MAKE A CLOSED BOX-STRUCTURE PLATFORM OUT OF COMPOSITE MATERIAL FOR A TURBINE ENGINE FAN

CROSS-REFERENCE TO RELATED APPLICATIONS

This application is a division of U.S. application Ser. No. 14/397,052 filed Oct. 24, 2014, the entire contents of which is incorporated herein by reference. U.S. application Ser. No. 14/397,052 is a 371 of International Application No. PCT/FR13/050841 filed Apr. 17, 2013, and claims the benefit of priority from prior French Application No. 1253881 filed Apr. 26, 2012.

BACKGROUND OF THE INVENTION

The present invention relates to the general field of making a fiber blank by three-dimensional (3D) weaving for fabricating a blade platform out of composite material for a fan of an aviation turbine engine.

Fan blade platforms for turbine engines, and in particular for turbojets, are arranged between the blades of the fan so as to extend an inlet cone of the fan. They serve in particular to define the inside of the annular air inlet passage into the fan, which passage is defined on the outside by a casing.

It is known to have recourse to composite materials for making various parts of an aviation turbine engine. Thus, a composite material part may be obtained by making a fiber preform and densifying the preform with a matrix. In the intended application, the preform may be made of glass, carbon, or ceramic fibers, and the matrix may be made out of an organic material (polymer), out of carbon, or out of ceramic.

For parts presenting a relatively complex geometrical shape, it is also known to make a fiber blank or structure as a single piece by 3D or multilayer weaving and to shape the fiber structure so as to obtain a fiber preform having a shape that is close to the shape of the part that is to be fabricated.

Proposals have thus already been made to use 3D weaving to make a fiber preform of π-shaped section for a platform. Such platforms with a π-shaped section comprising a base and two legs form stiffeners that extend from a face of the base and that serve to stiffen the platform so as to avoid any movement of the platform under the centrifugal force generated by the speed of rotation of the fan.

With such platforms, it has been found that the mere presence of stiffeners does not always give sufficient strength against centrifugal force. It has thus been found necessary to add a wall between the free ends of the stiffeners in order to form a closed box structure under the base of the platform so as to reinforce its strength. Unfortunately, that implies providing a covering on the stiffeners of the platform preform, which operation is difficult to perform because of the size of the fibers involved. Consequently, this operation can easily lead to a part being rejected.

OBJECT AND SUMMARY OF THE INVENTION

An object of the invention is thus to provide a fiber blank woven as a single piece by three-dimensional weaving for making a platform of closed box structure out of composite material for a turbine engine fan.

In a first aspect of the invention, this object is achieved by a fiber blank woven as a single piece by three-dimensional weaving, the fiber blank having opposite surfaces and presenting:

a first portion, a second portion, and a third portion, each comprising a plurality of layers of weft yarns and each forming a portion of the thickness of the fiber blank between its opposite surfaces, the weft yarns of the fiber blank being arranged in columns, each column having weft yarns in all three portions;

in each plane of the fiber blank, a set of warp yarns interlinking the layers of weft yarns of the first portion, of the second portion, and of the third portion, while forming:

a closed non-interlinked zone separating the first portion from the second portion over a fraction of the dimension of the fiber blank in the warp direction between an upstream non-interlinking limit and a downstream non-interlinking limit; and at least one open non-interlinked zone separating the second portion from the third portion over a fraction of the dimension of the fiber blank in the warp direction from a non-interlinking limit to a downstream edge of the fiber blank;

one or more first warp yarns interlinking layers of weft yarns in the first portion of the fiber blank adjacent to the closed non-interlinked zone, and layers of weft yarns in the second portion of the fiber blank before and after the closed non-interlinked zone;

one or more second warp yarns interlinking layers of weft yarns in the second portion of the fiber blank adjacent to the open non-interlinked zone, and layers of weft yarns in the first portion of the fiber blank before and after the closed non-interlinked zone;

one or more third warp yarns interlinking layers of weft yarns in the second portion of the fiber blank adjacent to the open non-interlinked zone, and layers of weft yarns in the third portion of the fiber blank before the open non-interlinked zone; and one or more fourth warp yarns interlinking layers of weft yarns in the third portion of the fiber blank adjacent to the open non-interlinked zone, and layers of weft yarns in the second portion of the fiber blank before the open non-interlinked zone.

Such 3D weaving makes it possible to make a fiber blank as a single piece for fabricating a platform that has a closed box structure under the base of the platform that serves to define the inside of the annular air inlet passage into the fan.

In an embodiment, the fiber blank further comprises one or more fifth warp yarns interlinking layers of weft yarns in the first portion of the fiber blank before the closed non-interlinked zone and adjacent thereto, and layers of weft yarns in the second portion of the fiber blank after the closed non-interlinked zone; and one or more sixth warp yarns interlinking layers of weft yarns in the second portion of the fiber blank before the closed non-interlinked zone and adjacent thereto, and layers of weft yarns in the first portion of the fiber blank after the closed non-interlinked zone.

The paths of the fifth warp yarn(s) and of the sixth warp yarn(s) advantageously cross in at least one transition zone extending in the fiber blank from the downstream limit of the closed non-interlinked zone, the transition zone extending in the warp direction over a distance longer than one pitch step between adjacent columns of weft yarns. Such crossing reinforces the downstream limit of the closed non-interlinked zone and may give rise to less stress on the yarns while unfolding a portion of the fiber blank adjacent to the closed non-interlink zone.

The non-interlinking limit of the open non-interlinked zone may be situated in the warp direction between the upstream and downstream limits of the closed non-interlinked zone.

In another embodiment, the fiber blank further includes a second open non-interlinked zone separating the second portion from the third portion over a fraction of the dimension of the fiber blank in the warp direction from an upstream edge of the fiber blank opposite from the downstream edge, up to a non-interlinking limit.

The third warp yarn(s) may interlink layers of weft yarns in the second portion of the fiber blank adjacent to the open non-interlinked zones, and layers of weft yarns in the third portion of the fiber blank between the open non-interlinked zones, and the fourth warp yarn(s) may interlink layers of weft yarns in the third portion of the fiber blank adjacent to the open non-interlinked zones, and layers of weft yarns in the second portion of the fiber blank between the open non-interlinked zones.

The non-interlinking limits of the open non-interlinked zones may be situated in the warp direction between the upstream and downstream limits of the closed non-interlinked zone.

In yet another embodiment, the fiber blank further includes two closed non-interlinked zones separating the second portion from the third portion over a fraction of the dimension of the fiber blank in the warp direction between the upstream and downstream limits of the closed non-interlinked zone, said two closed non-interlinked zones being for forming a platform box structure with a honeycomb arrangement. Such a honeycomb arrangement makes it possible to reinforce the buckling strength of the box structure of the platform while keeping control over thickness.

Under such circumstances, one or more sixth warp yarns may interlink layers of weft yarns in the second portion of the fiber blank before and after the two closed non-interlinked zones, and one or more seventh warp yarns may interlink layers of weft yarns in the third portion of the fiber blank before and after the two closed non-interlinked zones, the paths of the sixth warp yarns and of the seventh warp yarns crossing on three occasions in order to create the two non-interlinked zones.

Likewise, one or more eighth warp yarns may interlink layers of weft yarns in the second portion of the fiber blank before the two closed non-interlinked zones, and layers of weft yarns in the third portion of the fiber blank after the two closed non-interlinked zones, and one or more ninth warp yarns may interlink layers of weft yarns in the third portion of the fiber blank before the two closed non-interlinked zones, and layers of weft yarns in the second portion of the fiber blank after the two closed non-interlinked zones, the paths of the eighth warp yarn(s) and of the ninth warp yarn(s) crossing in a middle region of the two closed non-interlinked zones.

Regardless of the embodiment, the outer layers of weft yarns adjacent to the opposite surfaces of the fiber blank are advantageously woven with the same warp yarns extending continuously over the entire dimension of the fiber blank in the warp direction, thus preserving yarn continuity at the surface.

In a second aspect of the invention, the intended object is achieved with a fiber blank as defined above but with warp and weft interchanged.

In a third aspect of the invention, the invention provides a method of fabricating a preform for a closed box-structure platform out of composite material for a turbine engine fan, the method comprising making a fiber preform by shaping a fiber blank as defined in the first aspect of the invention, the shaping comprising unfolding fractions of the first portion and of the second portion of the fiber blank that are adjacent to the closed non-interlinked zone and to the open non-interlinked zone, cutting off the fractions of the first and second portions of the fiber blank after the closed non-interlinked zone, and densifying the preform with a matrix.

In a fourth aspect of the invention, the invention provides a method of fabricating a preform for a closed box-structure platform out of composite material for a turbine engine fan, the method comprising making a fiber preform by shaping a fiber blank as defined in the second aspect of the invention, the shaping comprising unfolding fractions of the first portion and of the second portion of the fiber blank that are adjacent to the closed non-interlinked zone and to the first and second open non-interlinked zones, cutting off the fractions of the first and second portions of the fiber blank before and after the closed non-interlinked zone, and densifying the preform with a matrix.

The shaping may further comprise shaping fractions of the second and third portions of the fiber blank that are situated between the upstream and downstream limits of the closed non-interlinked zone to form undulations in the box structure of the platform. A box structure provided with undulations presents improved buckling strength while keeping thickness under control.

In a fifth aspect of the invention, the invention provides a closed box-structure platform made out of composite material for a turbine engine fan, the platform being obtained by the method of the third or fourth aspect of the invention.

BRIEF DESCRIPTION OF THE DRAWINGS

Other characteristics and advantages of the present invention appear from the following description given with reference to the accompanying drawings, which show an embodiment having no limiting character. In the figures:

FIG. 2 is a diagrammatic view of a plane of a 3D woven fiber blank in an embodiment of the invention;

DETAILED DESCRIPTION OF THE INVENTION

Figure 1:
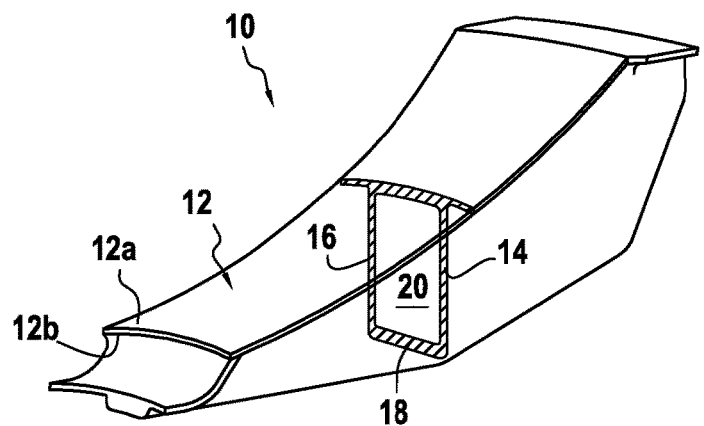
FIG. 1 is a diagrammatic view of a closed box-structure platform made of composite material for a turbine engine fan.

FIG. 1 is a very diagrammatic view of a closed box-structure platform 10 made of composite material for a turbine engine fan.

The platform 10 comprises a base 12 having a top face 12a and a bottom face 12b, together with two legs 14, 16 forming stiffeners and extending from the bottom face 12b. At their bottom ends, the two legs 14 and 16 are connected together by a stiffener wall 18 so as to form a closed box structure 20 under the base 12, as represented by shading in FIG. 1.

The platform 10 is for mounting in a gap between two fan blades, in the vicinity of their roots, so as to define the inside of an annular air inlet passage into the fan, the passage being defined on the outside by a fan casing.

FIG. 2 is a diagrammatic view of a warp plane of a 3D-woven fiber blank 100 from which a platform fiber preform can be shaped, prior to injecting resin or densifying with a matrix, and possible machining, in order to obtain a fan platform made of composite material, such as platform shown in FIG. 1.

In 3D weaving, it should be understood that the warp yarns follow sinuous paths so as to interlink weft yarns belonging to different layers of weft yarns, with the exception of non-interlinked zones, it being understood that 3D weaving, in particular when using an interlock weave, may include 2D weaving at the surface. Various 3D weaves can be used, such as interlock, multi-satin, or multi-plain weaves, for example, as described in particular in Document WO 2006/136755.

In FIG. 2, the fiber blank 100 presents opposite surfaces 100a and 100b, and it comprises a first portion 102, a second portion 104, and a third portion 106, the second portion 104 being positioned between the other two portions 102 and 106. These three portions form respectively first, second, and third portions of the thickness of the fiber blank between its opposite surfaces 100a and 100b.

Each portion 102 to 106 of the fiber blank has a plurality of superposed layers of weft yarns, four in the example shown, it being possible for the number of weft yarns to be any desired number not less than two, depending on the desired thickness. In addition, the number of layers of weft yarns in the portions 102 to 106 may differ from one another. The weft yarns are arranged in columns, each comprising weft yarns of the first, second, and third portions of the fiber blank.

Over a fraction of the dimension of the fiber blank 100 in the warp direction (c), the first portion 102 and the second portion 104 of the fiber blank are completely separated from each other by a closed non-interlinked zone 108 that extends between an upstream limit 108a and a downstream limit 108b for the non-interlinked zone. The term "closed" non-interlinked zone is used herein to mean a zone that is closed at both of its ends and that does not have any warp yarns passing therethrough to interlink weft yarns in layers belonging respectively to the first portion 102 and to the second portion 104 of the fiber blank 100.

Over another fraction of the dimension of the fiber blank 100 in the warp direction, the second portion 104 and the third portion 106 of the fiber blank are completely separated from each other by an open non-interlinked zone 110 that extends from a non-interlinking limit 110a to a downstream edge 100c of the fiber blank. The term "open" non-interlinked zone is used herein to mean a zone that is closed at one end and open at an opposite end and that does not have any warp yarns passing therethrough for interlinking the weft yarns of layers belonging respectively to the second portion 104 and to the third portion 106 of the fiber blank 100.

In this embodiment, the non-interlinking limit 110a of the open non-interlinked zone 110 is situated in the warp direction between the upstream and downstream limits 108a and 108b of the closed non-interlinked zone 108.

Except in the closed non-interlinked zone 108 and in the open non-interlinked zone 110, the layers of weft yarns are interlinked by warp yarns over a plurality of warp yarn layers $c_{11}$ to $c_{22}$.

Figure 3A:
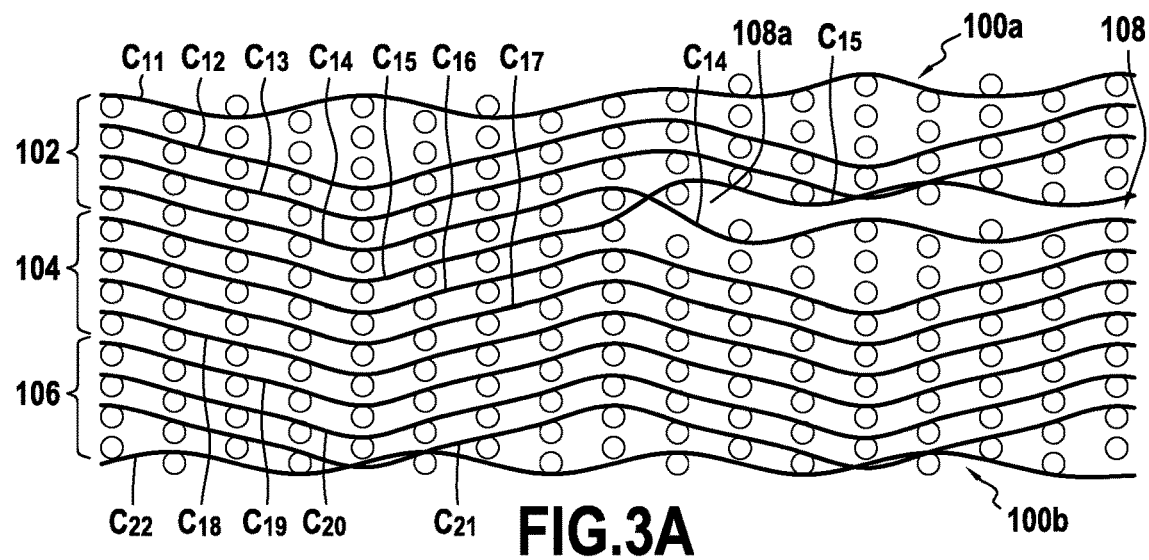
FIGS. 3A, 3B, and 3C are enlargements of FIG. 2.
Figure 3B:
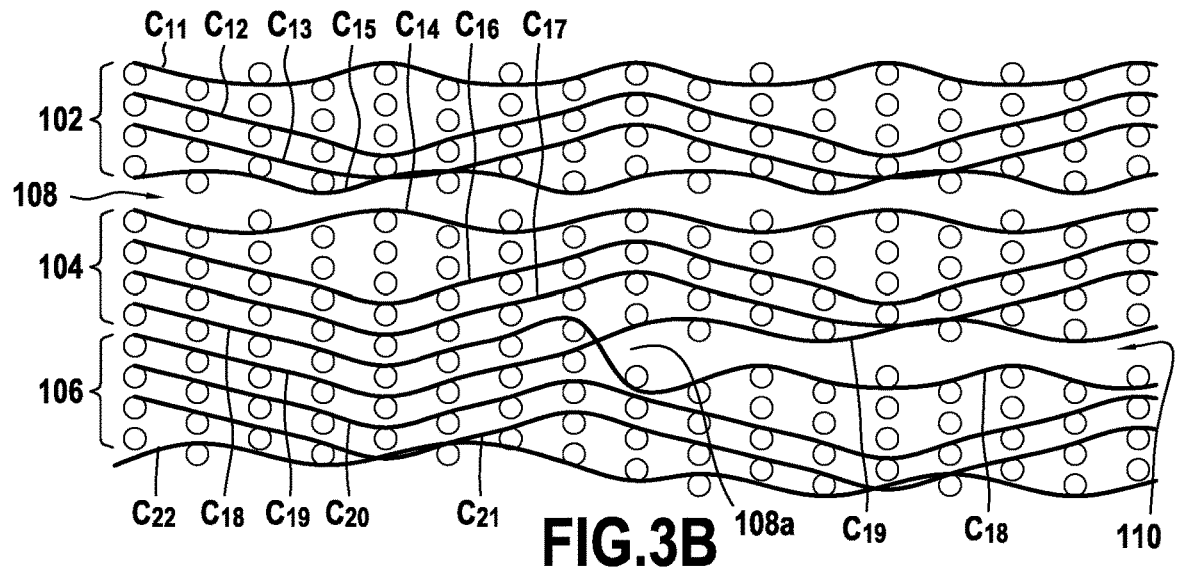
Figure 3C:
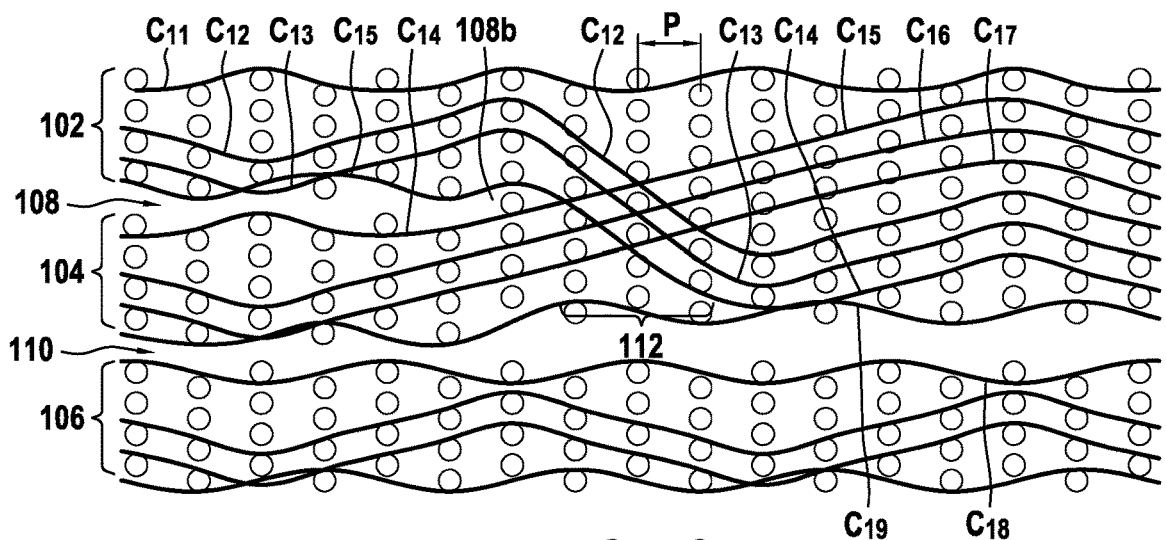

In the example shown more particularly in FIGS. 3A to 3C, a common first warp yarn $c_{15}$ interlinks the layers of weft yarns in the first portion 102 of the fiber blank adjacent to the closed non-interlinked zone 108 and layers of weft yarns in the second portion 104 of the fiber blank before and after the closed non-interlinked zone, i.e. before the upstream limit 108a and after the downstream limit 108b of the closed non-interlinked zone. Naturally, this interlinking could be performed by a plurality of first warp yarns.

Conversely, a common second warp yarn $c_{14}$ interlinks layers of weft yarns in the second portion 104 of the fiber blank adjacent to the open non-interlinked zone 110 and layers of weft yarns in the first portion 102 of the fiber blank before and after the closed non-interlinked zone. Naturally, this interlinking could be performed by a plurality of second warp yarns.

Thus, the path of the warp yarn $c_{15}$ and the path of the warp yarn $c_{14}$ cross both at the upstream limit 108a of the closed non-interlinked zone 108 and at the downstream limit 108b of this closed non-interlinked zone.

In the same manner, still in the example in FIGS. 3A to 3C, a common third warp yarn $c_{19}$ interlinks the layers of weft yarns in the second portion 104 of the fiber blank adjacent to the open non-interlinked zone 110, and layers of weft yarns in the third portion 106 of the fiber blank before the open non-interlinked zone, i.e. before the non-interlinking limit 110a of this open non-interlinked zone. Naturally, this interlinking could be performed by a plurality of third warp yarns.

Conversely, a common fourth warp yarn $c_{18}$ interlinks layers of weft yarns in the third portion 106 of the fiber blank adjacent to the open non-interlinked zone 110, and layers of weft yarns in the second portion 104 of the fiber blank before the open non-interlinked zone. Naturally, this interlinking could be performed by a plurality of fourth warp yarns.

Thus, the path of the warp yarn $c_{19}$ and the path of the warp yarn $c_{18}$ cross at the non-interlinking limit 110a of the open non-interlinked zone 110.

Furthermore, fifth warp yarns $c_{12}$, $c_{13}$ interlink layers of weft yarns in the first portion 102 of the fiber blank before the closed non-interlinked zone 108 and adjacent thereto, and layers of weft yarns in the second portion 104 of the fiber blank after the closed non-interlinked zone.

Likewise, sixth warp yarns $c_{16}$, $c_{17}$ interlink layers of weft yarns in the second portion 104 of the fiber blank before the closed non-interlinked portion 108 and adjacent thereto, and layers of weft yarns in the first portion 102 of the fiber blank after the closed non-interlinked zone.

As shown in FIG. 3C, the paths of the fifth warp yarns $c_{12}$, $c_{13}$ and the paths of the sixth warp yarns $c_{16}$, $c_{17}$ cross in a transition zone 112 extending in the fiber blank from the downstream limit 108b of the closed non-interlinked zone 108. This transition zone 112 extends in the warp direction over a distance that is longer than one pitch step p between adjacent columns of weft yarns, e.g. over a distance equal to 2p.

Such crossing between the fifth warp yarns $c_{12}$, $c_{13}$ and the sixth warp yarns $c_{16}$, $c_{17}$ reinforces the downstream limit 108b of the closed non-interlinked zone 108 and may give rise to less stress on the yarns while unfolding a portion of the fiber blank adjacent to the closed non-interlinked zone.

The outer layers of weft yarns adjacent to the opposite surfaces 100a and 100b of the fiber blank 100 are woven using the same warp yarns, respectively $c_{11}$ and $c_{22}$, that extend continuously over the entire dimension of the fiber blank in the warp direction. By way of example, it is possible to use a surface satin weave for the warp yarns $c_{11}$ and $c_{22}$. Likewise, it is also possible to use a surface satin weave for the warp yarns $c_{14}$ and $c_{15}$ in those fractions of the first and second portions of the fiber blank that are separated by the closed non-interlinked zone 108, and also for the warp yarns $c_{18}$ and $c_{19}$ in those fractions of the second and third portions of the fiber blank that are separated by the open non-interlinked zone 110.

A fiber preform for a closed box-structure platform (such as the platform shown in FIG. 1) may be obtained from such a fiber blank, in the manner described below.

Figure 5:
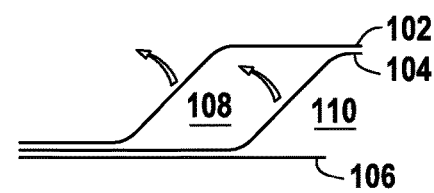
FIGS. 4 to 6 are very diagrammatic section views showing how the fiber blank of FIG. 2 is shaped to obtain a preform for a box-structure platform.
Figure 4:
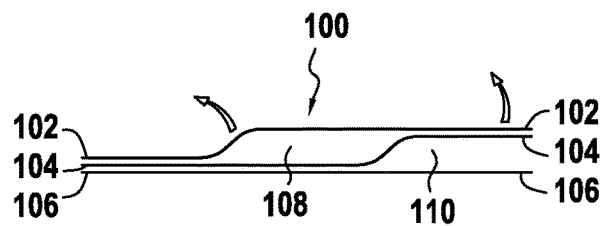
Figure 6:
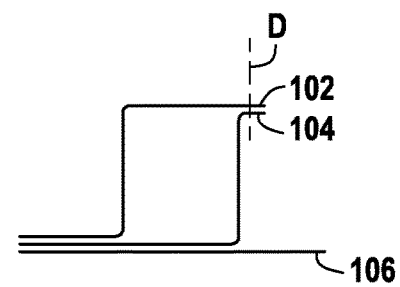

After weaving, the fiber blank 100 presents a shape as shown very diagrammatically in FIG. 4. The fractions of the first and second portions 102 and 104 in the fiber blank that are adjacent to the closed non-interlinked zone 108 and to the open non-interlinked zone 110 are unfolded as shown in FIG. 5, while the third portion 106 of the fiber blank is not manipulated. The final preform as obtained at the end of such unfolding is as shown in FIG. 6.

Figure 7A:
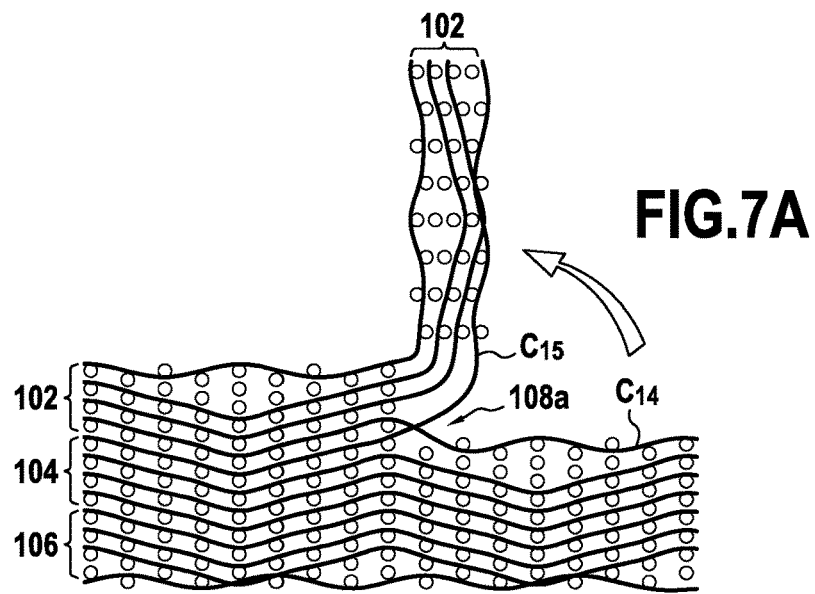
FIGS. 7A, 7B and 7C are views of the plane of the preform obtained by shaping the fiber blank corresponding to the views of FIGS. 3A, 3B, and 3C respectively.
Figure 7B:
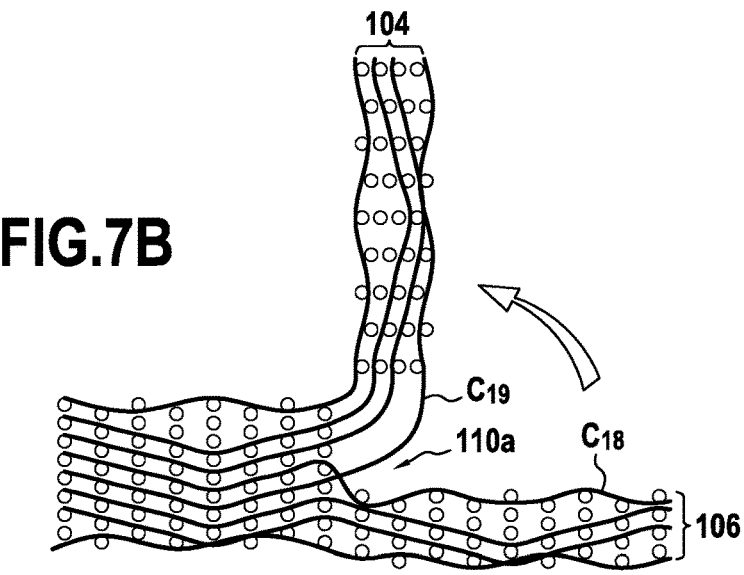
Figure 7C:
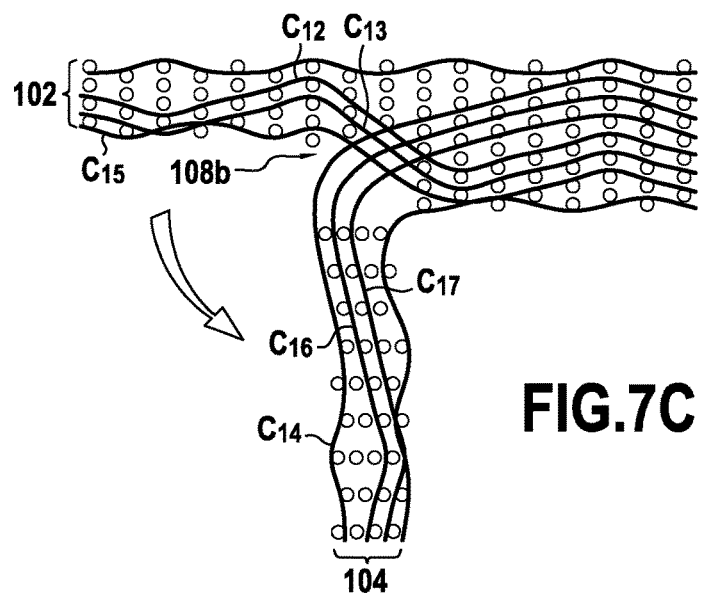

The unfolding of these fiber blank fractions is shown more particularly in FIGS. 7A to 7C. In particular, FIG. 7A corresponds to the enlargement of FIG. 3A and shows how the fraction of the first portion 102 of the fiber blank that is adjacent to the closed non-interlinked zone is unfolded. This unfolding takes place perpendicularly to the fraction of the second portion of the fiber blank that is adjacent to the closed non-interlinked zone.

FIG. 7B likewise shows the folding that takes place in a region of the fiber blank that corresponds to the enlargement of FIG. 3B. In this example, the fraction of the second portion 104 of the fiber blank that is adjacent to the open non-interlinked zone is unfolded perpendicularly to the fraction of the third portion 106 of the fiber blank that is adjacent to the open non-interlinked zone.

Finally, FIG. 7C shows the unfolding that is performed in the region of the fiber blank that corresponds to the enlargement of FIG. 3C, i.e. at the downstream limit 108b of the closed non-interlinked zone 108. In this region, the fraction of the second portion 104 of the fiber blank that is adjacent to the closed non-interlinked zone is unfolded perpendicularly to the fraction of the first portion 102 of the fiber blank that is adjacent to the closed non-interlinked zone. After this unfolding, the fractions of the first and second portions of the fiber blank that are situated beyond the closed non-interlinked zone, i.e. beyond the downstream end 108b of the non-interlinked zone 108, are cut off along a cutting plane D (see also FIG. 6).

The shaping of the fiber blank 100 thus makes it possible to obtain a preform for a closed box-structure platform as described above with reference to FIG. 1.

Figures 8, 9:
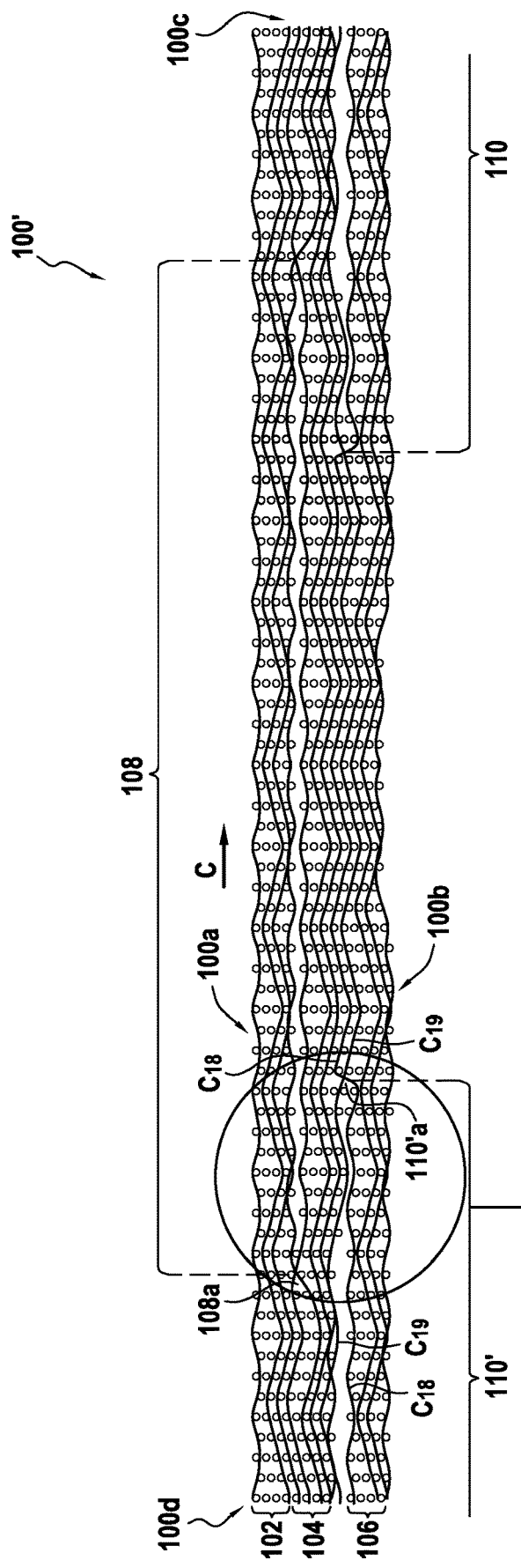
FIG. 8 is a diagrammatic view of a plane of a 3D woven fiber blank in another embodiment of the invention.
FIG. 9 is an enlargement of FIG. 8.
Figure 9:
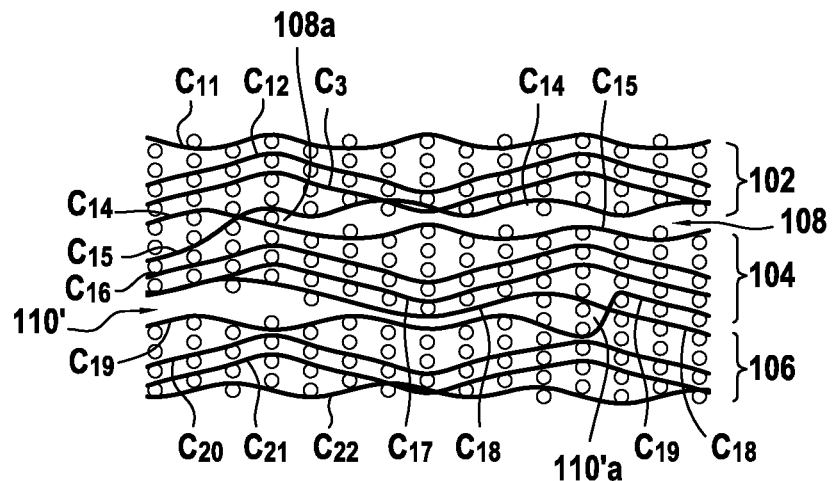

FIG. 8 is a diagram showing a warp plane in a 3D woven fiber blank 100' for obtaining a platform of closed box structure in another embodiment of the invention. Elements in common between the fiber blank 100' of FIG. 8 and the fiber blank 100 of FIG. 2 are given the same references and are not described again.

The fiber blank 100' differs from the fiber blank of FIG. 2 by the presence of a second open non-interlinked zone 110' between the second portion 104 and the third portion 106 over a fraction of the fiber blank in the warp direction (c), this second open non-interlinked zone 110' extending from an upstream edge 100d of the fiber blank opposite from its downstream edge 100c and up to a non-interlinking limit 110'a.

For this purpose, and as shown more particularly in FIG. 9, a common third warp yarn $c_{19}$ interlinks layers of weft yarns in the second portion 104 of the fiber blank 100' that are adjacent to both of the open non-interlinked zones 110, 110', and layers of weft yarns in the third portion 106 of the fiber blank between these open non-interlinked zones, i.e. between the respective non-interlinking limits 110'a and 110a of these open non-interlinked zones.

Likewise, a common fourth warp yarn $c_{18}$ interlinks layers of weft yarns in the third portion 106 of the fiber blank 100' adjacent to both of the open non-interlinked zones 110, 110', and layers of weft yarns in the second portion 104 of the fiber blank between these open non-interlinked zones.

Naturally, this interlinking by the third and fourth warp yarns could be performed by pluralities of third and fourth warp yarns. It is also possible to use a surface satin weave for the warp yarns $c_{18}$ and $c_{19}$ in the fractions of the second and third portions of the fiber blank that are separated by the two open non-interlinked zones 110, 110'.

The second open non-interlinked zone 110' between the second and third portions 104 and 106 of the fiber blank 100' is identical to the closed non-interlinked zone 110 described with reference to the embodiment of FIG. 2. The same applies to the closed non-interlinked zone 108 between the first and second portions 102 and 104 of the fiber blank.

In addition, the non-interlinking limits 110a, 110'a of the two open non-interlinked zones 110, 110' of the fiber blank 100' are situated in the warp direction between the upstream and downstream limits 108a and 108b of the closed non-interlinked zone 108.

A fiber preform for a closed box-structure platform (such as the platform shown in FIG. 1) can be obtained from such a fiber blank in the manner described below.

Figure 10:
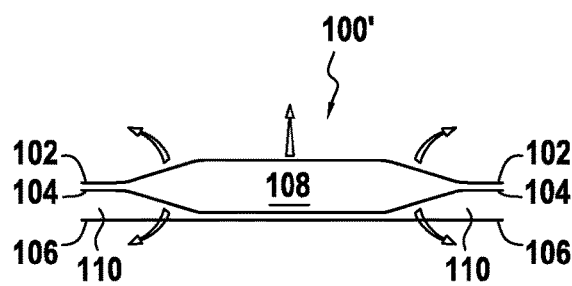
FIGS. 10 and 11 are very diagrammatic section views showing how the fiber blank of FIG. 8 is shaped to obtain a preform for a box-structure platform.

After weaving, the fiber blank 100' presents a shape as shown very diagrammatically in FIG. 10. The fractions of the first portion 102 and of the second portion 104 of the fiber blank that are adjacent to the closed non-interlinked zone 108 and to the two open non-interlinked zones 110, 110' are unfolded as shown in FIG. 11, while the third portion 106 of the fiber blank is not manipulated.

Figure 11:
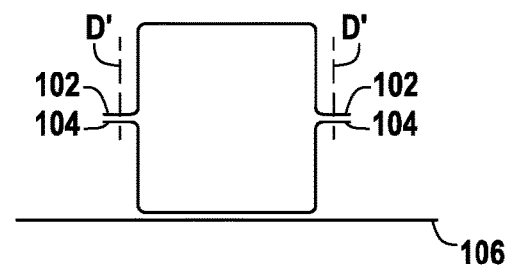

More precisely, unfolding the fractions of the first and second portions 102 and 104 of the fiber blank 100' that are adjacent to the closed non-interlinked zone 108 causes this closed non-interlinked zone to be opened through 180° at its non-interlinking limit (see FIG. 11).

Figure 12:
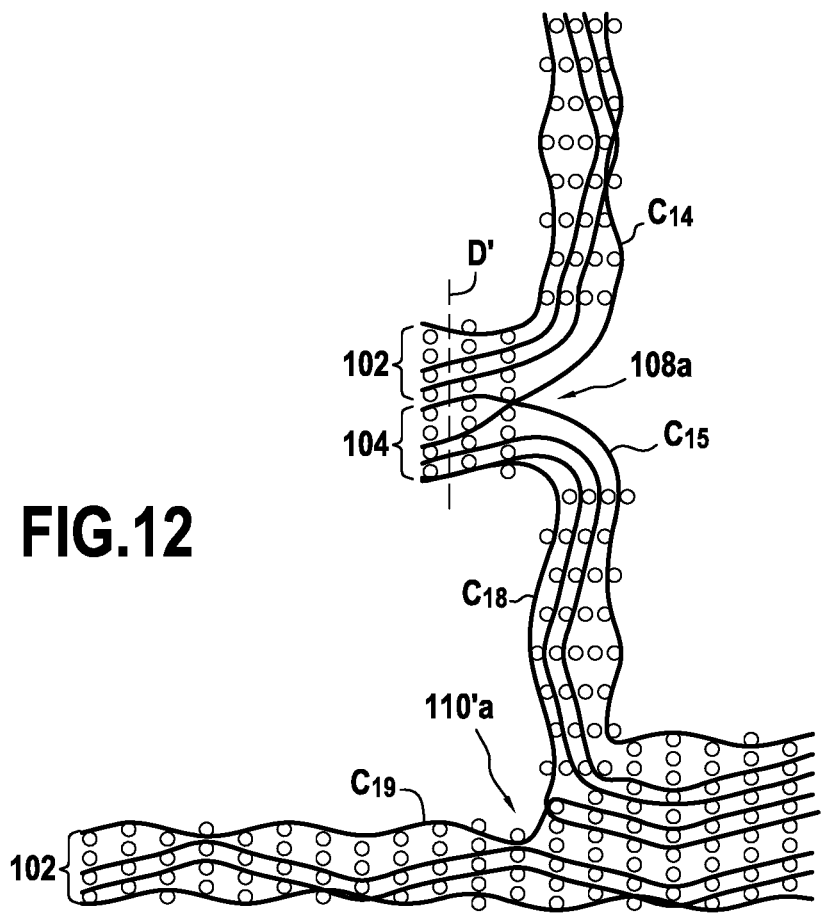
FIG. 12 is a fragmentary view of the plane of the preform obtained by shaping the fiber blank of FIG. 8.

Thus, FIG. 12 shows such unfolding in a region of the fiber blank corresponding to the upstream non-interlinking limit 108a of the closed non-interlinked zone. In this region, the fractions of the first and second portions 102 and 104 of the fiber blank that are adjacent to the closed non-interlinked zone are unfolded so that they form between them an angle of about 180°.

After the operation of unfolding the fiber blank, the fractions of the first and second portions of the fiber blank 100' that are situated before and after the closed non-interlinked zone 108, i.e. before the upstream non-interlinking limit 108a and after the downstream non-interlinking limit 108b thereof, are cut off on cutting planes D' (see also FIG. 11).

In the embodiments described, it should be understood that the weft and warp directions could be interchanged.

Furthermore, in the embodiments described, the fiber blank 100, 100' is formed by 3D weaving with yarns of nature that is selected as a function of the intended application, e.g. yarns made of glass, carbon, or ceramic fibers.

The matrix is deposited in the fiber preform (as obtained by shaping the fiber blank) in order to form a closed box-structure platform made of composite material by holding the preform in a mold until the preform has been stiffened (or consolidated). Prior to putting the preform in the mold, a core is arranged inside the closed non-interlinked zone of the preform.

The nature of the matrix is selected as a function of the intended application, for example an organic matrix obtained in particular from a resin that is a precursor for a polymer matrix such as an epoxy, bismaleimide, or polyimide matrix, or that is a precursor for a carbon matrix or for a ceramic matrix. For an organic matrix, the fiber preform is impregnated by a composition containing the matrix precursor resin, prior to being shaped in tooling, or after shaping, with impregnation then being performed by infusion or by a process of the resin transfer molding (RTM) type, for example. For a carbon matrix or a ceramic matrix, densification may be performed by chemical vapor infiltration (CVI) or by impregnating with a liquid composition containing a precursor resin for carbon or for ceramic and by performing pyrolysis heat treatment or ceramization of the precursor, which methods are themselves well known. The platform is machined to its final dimensions after the fiber preform has been injected/densified.

Figure 13:
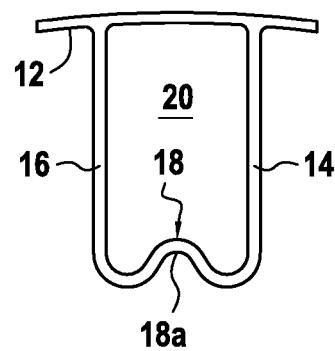
FIGS. 13 and 14 are cross-section views of preforms for closed box-structure platforms in variant embodiments of the invention.
Figure 14:
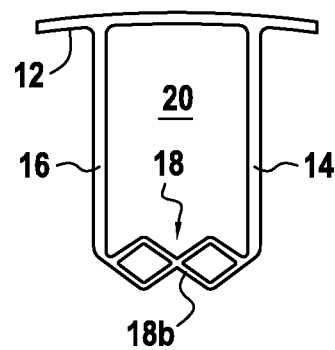

FIGS. 13 and 14 show variant embodiments of preforms for making platforms of closed box structure.

In these variant embodiments, the stiffener wall 18 of the closed box structure under the base 12 of the platform presents increased buckling strength without any need to increase the thickness of the stiffener wall. Thus, in the variant embodiment of FIG. 13, the stiffener wall 18 presents undulations 18a. Likewise, in the variant embodiment of FIG. 14, the stiffener wall 18 presents a honeycomb arrangement 18b.

These particular structures 18a, 18b serve to reinforce the ability of the box structure of the platform to withstand the compression forces to which the platform is subjected.

The structure with an undulation 18a as shown in FIG. 13 is obtained during the step of shaping the fiber blank, that is itself obtained as described above. In particular, the fiber blank may be made using the embodiment described with reference to FIGS. 2 and 3A to 3C or the embodiment described with reference to FIGS. 8 and 9.

During the step of shaping the fiber blank, the fractions of the second and third portions of the fiber blank that are to form the preform for the stiffener wall (i.e. that are situated between the upstream and downstream limits of the closed non-interlinked zone of the fiber blank) are themselves deformed with the help of special tooling for forming undulations of the kind shown in FIG. 13. The number and the amplitude of the undulations that are created may vary depending on mechanical requirements.

The honeycomb arrangement 18b of FIG. 14 is obtained by a variation to the weaving of the fiber blank as obtained in either of the two embodiments described above.

Figure 15:
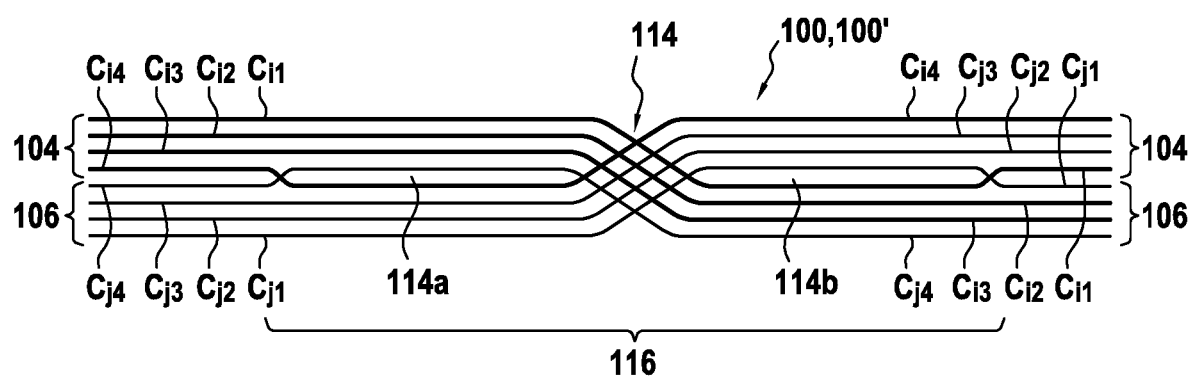
FIG. 15 is a fragmentary view of a plane of a fiber blank for obtaining the FIG. 14 platform preform.

In particular, the fiber blank 100, 100' as shown in part in FIG. 15 (with weft yarns omitted for reasons of clarity) further includes a pair of closed non-interlinked zones 114 that separate the second portion 104 from the third portion 106 over a fraction 116 of the dimension of the fiber blank in the warp direction. This fraction 116 also extends between the upstream and downstream limits 108a and 108b of the closed non-interlinked zone 108 shown in FIGS. 2 and 8.

More precisely, the fraction 116 of the fiber blank in which the pair of closed non-interlinked zones 114 is made is situated, for a fiber blank 100 of the embodiment shown in FIG. 2, between the upstream limit 108a of the closed non-interlinked zone and the non-interlinking limit 110a of the open non-interlinked zone 110, and for a fiber blank 100' of the embodiment shown in FIG. 8, between the non-interlinking limit 110'a of the second open non-interlinked zone 110' and the non-interlinking limit 110a of the open non-interlinked zone 110.

Furthermore, the pair of closed non-interlinked zones 114 between the second and third portions 104 and 106 of the fiber blank consists of two closed non-interlinked zones that are adjacent to each other and given respective references 114a and 114b.

More precisely, one or more sixth warp yarns $c_{i1}$ and $c_{i4}$ interlink layers of weft yarns in the second portion 104 of the fiber blank before and after the pair of closed non-interlinked zones 114, and one or more seventh warp yarns $c_{j1}$ and $c_{j4}$ interlinked layers of weft yarns in the third portion 106 of the fiber blank before and after the pair of closed non-interlinked zones. The paths of the sixth warp yarns $c_{i1}$, $c_{i4}$ and of the seventh warp yarns $c_{j1}$, $c_{j4}$ cross at three locations in order to create the two closed non-interlinked zones.

Furthermore, one or more eighth warp yarns $c_{i2}$ and $c_{i3}$ interlink layers of weft yarns in the second portion 104 of the fiber blank before the pair of closed non-interlinked zones 114, and layers of weft yarns in the third portion 106 of the fiber blank after the pair of closed non-interlinked zones.

Likewise, one or more ninth warp yarns $c_{j2}$ and $c_{j3}$ interlink layers of weft yarns in the third portion 106 of the fiber blank before the pair of closed non-interlinked zones 114, and layers of weft yarns in the second portion 104 of the fiber blank after the pair of closed non-interlinked zones.

The paths of the eighth warp yarn(s) $c_{i2}$, $c_{i3}$ and of the ninth warp yarn(s) $c_{j2}$, $c_{j3}$ cross in a middle region of the pair of closed non-interlinked zones 114, i.e. level with the junction between the two closed non-interlinked zones 114a and 114b.

It should be observed that with a fiber blank obtained in the embodiment of FIGS. 2 and 3A to 3C, the sixth above-mentioned warp yarns $c_{i1}$, $c_{i4}$ correspond respectively to the warp yarns $c_{14}$ and $c_{18}$ mentioned in that embodiment, with the seventh warp yarns $c_{j1}$, $c_{j4}$ corresponding respectively to the warp yarns $c_{19}$ and $c_{22}$, the eighth warp yarns $c_{i2}$, $c_{i3}$ corresponding respectively to the warp yarns $c_{16}$ and $c_{17}$, and the ninth warp yarns $c_{j2}$, $c_{j3}$ corresponding respectively to the warp yarns $c_{20}$ and $c_{21}$.

Likewise, in a fiber blank obtained in the embodiment of FIGS. 8 and 9, the sixth above-mentioned warp yarns $c_{i1}$, $c_{i4}$ correspond respectively to the warp yarns $c_{14}$ and $c_{19}$ mentioned in that embodiment, with the seventh warp yarns $c_{j1}$, $c_{j4}$ corresponding respectively to the warp yarns $c_{18}$ and $c_{22}$, with the eighth warp yarns $c_{i2}$, $c_{i3}$ corresponding respectively to the warp yarns $c_{16}$ and $c_{17}$, and with the ninth warp yarns $c_{j2}$, $c_{j3}$ corresponding respectively to the warp yarns $c_{20}$ and $c_{21}$.

It should also be observed that the weft and warp yarns could be interchanged.

The preform for the closed box-structure platform that is provided with a honeycomb arrangement 18b as shown in FIG. 14 is obtained by shaping the fiber blank woven in this way. In particular, the closed non-interlinked zones 114a and 114b making up the two closed non-interlinked zones 114 are unfolded so as to form two adjacent cells. The number and the dimensions of the cells may be varied depending on mechanical requirements.

The invention claimed is:

1. A fiber blank woven as a single piece by three-dimensional weaving for making a platform of closed box structure out of composite material for a turbine engine fan, the fiber blank having opposite surfaces and comprising:
a first portion, a second portion, and a third portion, each comprising a plurality of layers of weft yarns and each forming a portion of the thickness of the fiber blank between its opposite surfaces, the weft yarns of the fiber blank being arranged in columns, each column having weft yarns in all three portions;
in each plane of the fiber blank, a set of warp yarns interlinking the layers of weft yarns of the first portion, of the second portion, and of the third portion, while forming:
a closed non-interlinked zone separating the first portion from the second portion over a fraction of the dimension of the fiber blank in the warp direction between an upstream non-interlinking limit and a downstream non-interlinking limit; and
at least one open non-interlinked zone separating the second portion from the third portion over a fraction of the dimension of the fiber blank in the warp direction from a non-interlinking limit to a downstream edge of the fiber blank;
one or more first warp yarns interlinking layers of weft yarns in the first portion of the fiber blank adjacent to the closed non-interlinked zone, and layers of weft yarns in the second portion of the fiber blank before and after the closed non-interlinked zone;
one or more second warp yarns interlinking layers of weft yarns in the second portion of the fiber blank adjacent to the open non-interlinked zone, and layers of weft yarns in the first portion of the fiber blank before and after the closed non-interlinked zone;
one or more third warp yarns interlinking layers of weft yarns in the second portion of the fiber blank adjacent to the open non-interlinked zone, and layers of weft yarns in the third portion of the fiber blank before the open non-interlinked zone; and
one or more fourth warp yarns interlinking layers of weft yarns in the third portion of the fiber blank adjacent to the open non-interlinked zone, and layers of weft yarns in the second portion of the fiber blank before the open non-interlinked zone,
wherein except in the closed non-interlinked zone and in the open non-interlinked zone, the layers of weft yarns are interlinked by warp yarns over a plurality of warp yarn layers.

2. A fiber blank according to claim 1, further comprising:
one or more fifth warp yarns interlinking layers of weft yarns in the first portion of the fiber blank before the closed non-interlinked zone and adjacent thereto, and layers of weft yarns in the second portion of the fiber blank after the closed non-interlinked zone; and
one or more sixth warp yarns interlinking layers of weft yarns in the second portion of the fiber blank before the closed non-interlinked zone and adjacent thereto, and layers of weft yarns in the first portion of the fiber blank after the closed non-interlinked zone.

3. A fiber blank according to claim 1, wherein the non-interlinking limit of the open non-interlinked zone is situated in the warp direction between the upstream and downstream limits of the closed non-interlinked zone.

4. A fiber blank according to claim 1, further comprising a second open non-interlinked zone separating the second portion from the third portion over a fraction of the dimension of the fiber blank in the warp direction from an upstream edge of the fiber blank opposite from the downstream edge, up to a non-interlinking limit.

5. A fiber blank according to claim 1, further comprising two closed non-interlinked zones separating the second portion from the third portion over a fraction of the dimension of the fiber blank in the warp direction between the upstream and downstream limits of the closed non-interlinked zone, the two closed non-interlinked zones being for forming a platform box structure with a honeycomb arrangement.

6. A fiber blank according to claim 5, wherein:
one or more eighth warp yarns interlink layers of weft yarns in the second portion of the fiber blank before the two closed non-interlinked zones, and layers of weft yarns in the third portion of the fiber blank after the two closed non-interlinked zones; and
one or more ninth warp yarns interlink layers of weft yarns in the third portion of the fiber blank before the two closed non-interlinked zones, and layers of weft yarns in the second portion of the fiber blank after the two closed non-interlinked zones;
the paths of the eighth warp yarn(s) and of the ninth warp yarn(s) crossing in a middle region of the two closed non-interlinked zones.

7. A fiber blank according to claim 1, wherein the outer layers of weft yarns adjacent to the opposite surfaces of the fiber blank are woven with the same warp yarns extending continuously over the entire dimension of the fiber blank in the warp direction.

8. A method of fabricating a preform for a closed box-structure platform out of composite material for a turbine engine fan, the method comprising:
making a fiber preform by shaping a fiber blank according to claim 1, the shaping comprising unfolding fractions of the first portion and of the second portion of the fiber blank that are adjacent to the closed non-interlinked zone and to the open non-interlinked zone;
cutting off the fractions of the first and second portions of the fiber blank after the closed non-interlinked zone; and
densifying the preform with a matrix.

9. A method of fabricating a preform for a closed box-structure platform out of composite material for a turbine engine fan, the method comprising:
making a fiber preform by shaping a fiber blank according to claim 4, the shaping comprising unfolding fractions of the first portion and of the second portion of the fiber blank that are adjacent to the closed non-interlinked zone and to the first and second open non-interlinked zones;
cutting off the fractions of the first and second portions of the fiber blank before and after the closed non-interlinked zone; and
densifying the preform with a matrix.

10. A method according to claim 8, wherein the shaping further comprises shaping fractions of the second and third portions of the fiber blank that are situated between the upstream and downstream limits of the closed non-interlinked zone to form undulations in the box structure of the platform.

11. A closed box-structure platform made out of composite material for a turbine engine fan, the platform being obtained by the method according to claim 8.

12. A fiber blank according to claim 1, wherein a path of the one or more first warp yarns and a path of the one or more second warp yarns cross at both the upstream limit of the closed non-interlinked zone and the downstream limit of the closed non-interlinked zone.

13. A fiber blank according to claim 1, wherein a path of the one or more third warp yarn and a path of the one or more fourth warp yarns cross at the non-interlinking limit of the open non-interlinked zone.

* * * * *